Jan. 10, 1950     J. P. SANDERSON ET AL     2,494,145
CARBON DIOXIDE GENERATOR
Filed March 16, 1945
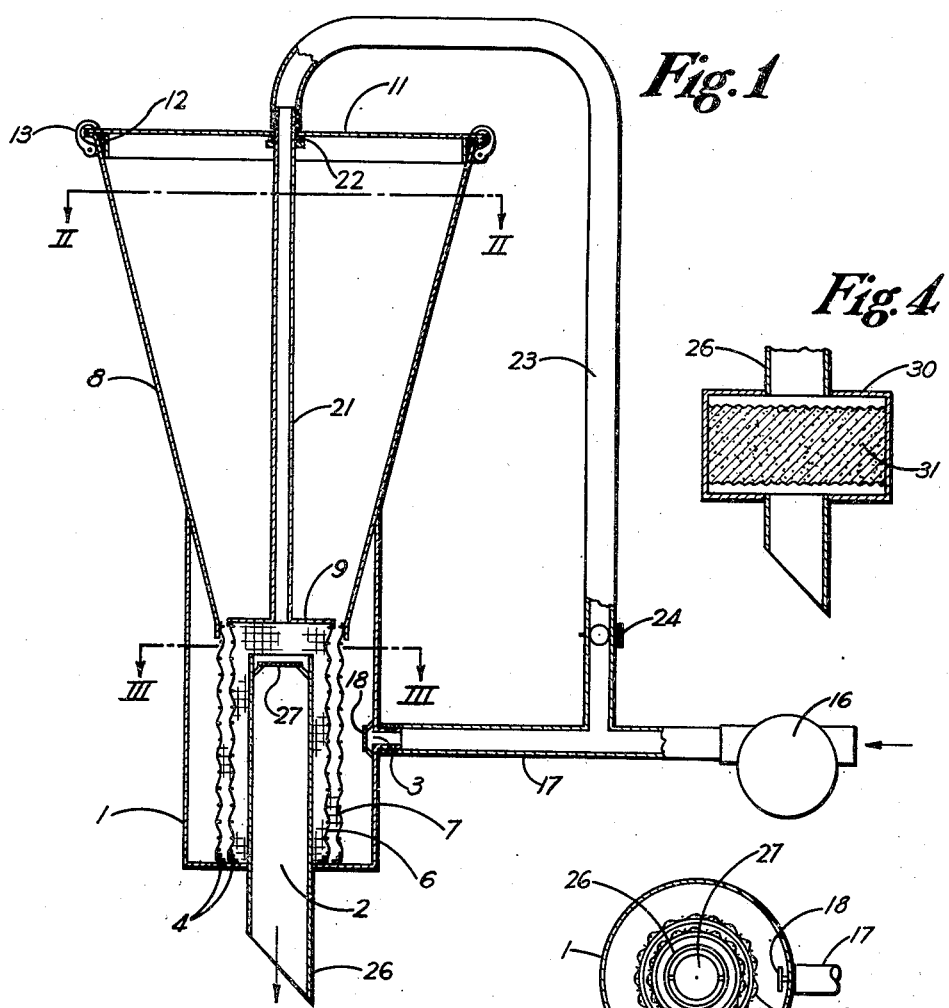

Patented Jan. 10, 1950

2,494,145

UNITED STATES PATENT OFFICE 2,494,145

CARBON DIOXIDE GENERATOR

John P. Sanderson, Peter V. Paulus, and William P. Yant, Pittsburgh, Pa., assignors to Mine Safety Appliances Company, Pittsburgh, Pa., a corporation of Pennsylvania Application March 16, 1945, Serial No. 583,126

7 Claims. (Cl. 23—281)

This invention relates to a method and means for reacting fluid media and solids, and more specifically to substantially removing oxygen from oxygen-containing gas to produce another gas. In one form of the invention elemental oxygen is removed from atmospheric air which is converted into essentially carbon dioxide and nitrogen containing a negligible amount of carbon monoxide and very little moisture, the amount of moisture being commensurate with the humidity of the air being converted.

Such gas mixtures can be used to prevent and to extinguish fires and explosions of combustible gases, liquids, and solids, and from this viewpoint are called "inert gases." It is well known that flame and explosion reactions will proceed only when there is sufficient oxygen present to support them. The amount of oxygen required varies with different types of combustibles. It is also well known that flammability or combustion, and consequently fires and explosions, can be prevented, controlled, or extinguished by creating and maintaining the required oxygen deficiency in the environment of the combustible. A common practice is either to dilute the normal atmosphere by adding inert gas that is deficient in oxygen or to completely exclude atmosphere air by maintaining an envelope or blanket of inert gas.

An advantage of carbon dioxide as a component of the inert gas lies in its relatively high specific heat, or in other words, in its ability to absorb comparatively large amounts of heat with only a comparatively small increase in its temperature. In this manner carbon dioxide exerts an important heat absorbing and consequently cooling effect on the combustion reactions and thereby slows down the reactions, and, in fact, may lower the temperature below that which flame propagation can proceed. Consequently, it would require a smaller amount of carbon dioxide, or of a mixture of carbon dioxide and nitrogen, to prevent or blanket flame propagation than it would of a gas of lower specific heat, such as nitrogen alone. This is a way of describing the so-called extinction effect of inert gases which states that the greater the value of the specific heat of an inert gas or mixture of inert gases, the smaller is the volume required to extinguish a flammable gas mixture if the thermal conductivities of the inert gases being compared are of the same order of magnitude. Thus, whereas it takes six volumes of nitrogen or ten volumes of argon to extinguish the flammability of one volume of methane in air, it requires only about three volumes of carbon dioxide. Flame prevention based on this phenomenon can take place in the presence of an oxygen concentration which is sufficient to support combustion. However, the influence is directly additive to the previously mentioned influence of decrease in oxygen.

A low moisture content in such an inert gas is advantageous and often necessary in some circumstances such as flushing out fuel lines or gas tanks where the presence of appreciable amounts of moisture would later be undesirable, or when diluting atmosphere at low temperatures, such as in high altitude flying, where the condensing and freezing of the moisture would likely present a hazard. Trouble from considerable amounts of water in the gasoline engine exhaust gas is an important disadvantage in the use of such gases for these purposes. Another disadvantage is the presence of significant amounts of corrosive gases in the engine exhaust gas.

It is among the objects of this invention to provide a gas generator which is small and compact, which can generate a large quantity of inert atmosphere over a long period of time, which is easy and inexpensive to operate, and which produces a gas low in water vapor and containing practically no carbon monoxide.

In accordance with this invention a continuous stream of oxygen-containing gas, such as atmospheric air, is supplied to the inlet of a housing that is also provided with an outlet. The housing contains a perforated receptacle in which a suitable material is burned. This receptacle is mounted in the path of the gas flowing from the inlet to the outlet of the housing. As the oxygen-containing gas flows through the burning material, oxygen is removed from the gas. If the burning material is carbonaceous, carbon dioxide will be formed and will escape from the housing through its outlet. A large volume of air per minute can be forced through the housing, so the temperature therein becomes very high and an undesirable amount of carbon monoxide is formed. However, this carbon monoxide is mixed, while still very hot, with oxygen-containing gas entering the housing through a secondary inlet, and the burning mixture converts the carbon monoxide into carbon dioxide. The carbonaceous material preferably is supplied to the burner continuously, such as by gravity from a hopper mounted on top of the housing.

The preferred embodiment of the invention is illustrated in the accompanying drawings in which Fig. 1 is a central vertical section through our generator; Figs. 2 and 3 are horizontal sections taken on the lines II—II and III—III, respectively, of Fig. 1; and Fig. 4 is a fragmentary view of a modification.

Referring to the drawings, an upright cylindrical housing 1 has an open top and a closed bottom. The center of the bottom wall is provided with an outlet opening 2 through it, while the side wall of the housing is provided with an inlet opening 3. Rigidly mounted on the bottom wall inside the housing is a pair of upright annular flanges 4 that are concentric with the outlet opening. These flanges are spaced radially from each other and from the side wall of the housing. Resting on the bottom of the housing is a pair of perforated tubular members 6 and 7, each encircling and positioned by one of the flanges 4. These members preferably are formed from stainless steel screen shaped into vertical cylinders. The space between the two screens is adapted to receive suitable material which is burned in the perforated container thus formed. The material can be ignited in any suitable manner, such as by preheated air, electrical resistors, or chemical igniters. In one form of the invention carbonaceous material is used, such as activated carbon or charcoal.

Rigidly mounted on top of the housing is a conical hopper the lower end of which extends downwardly from the upper edge of the housing to the top of the outer screen to close the space between them and to hold the top of the screen in position. The top of the central space formed by the inner screen is covered by a removable flanged closure member 9. It will thus be seen that the charcoal or other material in the hopper will flow down into the space between the two screens and keep it filled as the charcoal burns away. Also, if a gas is forced into the housing through its inlet 3, the gas will pass through the screens and the layer of glowing charcoal and out through the outlet 2. The top of the hopper is closed by a removable cover 11 provided with a sealing gasket 12 and held in place by any suitable clamping devices 13.

Although this apparatus can be used for generating other gases, it is intended primarily for converting oxygen, either pure or mixed with other gases, into carbon dioxide. For most economical operation air may be the gas that supplies the oxygen. A steady stream of air can be delivered to the housing either by forcing it in by mechanical means, or by providing the inlet with an air scoop when the apparatus is carried by a rapidly moving vehicle such as an airplane. Fig. 1 of the drawing shows a blower 16 for delivering air from the atmosphere through a pipe 17 to the housing inlet. Attached to the inside of the housing behind inlet 3 is a baffle plate 18 to deflect the incoming air in all directions so that it will completely encircle the outer screen.

As the air passes through the screens and the burning charcoal between them, the oxygen in the air combines with the carbon to form carbon dioxide. Some carbon monoxide also is formed, especially when the temperature in the housing is high due to a large volume of air per minute being forced through it. In order to get rid of most of the carbon monoxide, secondary air is mixed with it before it can escape through the housing outlet. This may be done by providing closure 9 for the inner screen with a central inlet opening from which a pipe 21 extends upwardly through a hole in the center of the hopper cover. The clearance between the pipe and cover is sealed by a resilient sealing ring 22 mounted on the pipe and tightly engaging the cover. Another pipe 23 detachably connects the upper end of this vertical pipe to pipe 17, preferably through a valve 24 by which the flow of secondary air is regulated. To promote thorough mixing of the carbon monoxide and secondary air, so that combustion will continue and the carbon monoxide thus combine with the oxygen of the secondary air, an outlet pipe 26 is mounted in the housing outlet and extends up inside the inner screen. A suitable mixing device, such as a baffle plate 27, is mounted in the upper end of this pipe. This plate compels the secondary air and the effluent mixture to enter the pipe through a narrow annular slot. As they expand below the baffle plate they mix together effectively, and as combustion is still taking place, the oxygen in the secondary air combines with and converts the carbon monoxide into the dioxide. For most consistently efficient conversion, it is advisable to have a slight excess of oxygen present in the final effluent gas mixture. This can be effected by controlling, through valve 24, the amount of secondary air admitted to the housing.

A generator that has been made in accordance with this disclosure, in which the screens are about seven inches high with a half inch space between them and the diameter of the screens being about four inches, converts five cubic feet of air per minute for many hours. Of course, the amount of air that can thus be converted depends on the surface area of the screens. The approximate composition of the effluent mixture has been found to be from 17 per cent to 20 per cent carbon dioxide, less than 2 per cent oxygen, less than 0.002 per cent carbon monoxide, and the remainder nitrogen.

In the embodiment illustrated in Fig. 1, the hopper is opened by first disconnecting branch pipe 23 from vertical pipe 21 and then lifting the cover off the vertical pipe after clamps 13 have been released. By pulling up on the vertical pipe, closure member 9 can be removed from the inner screen in order to permit the screens to be inspected or removed from the housing.

Although this generator is very small compared with those known heretofore, it can generate a large quantity of gas because it operates at a very high temperature, thus permitting the carbon monoxide resulting from passing a large volume of air through it per minute to be burned out. In other words, the reaction of the primary air with the burning carbon, and the secondary burning of the carbon monoxide, produces a much larger quantity of inert gas than can be obtained by ordinary combustion procedures. The final gas is low in oxygen and water vapor. The use of burning carbon makes the production of carbon dioxide possible without the addition of water to it, as is the case with exhaust gases from internal combustion engines. Our mixture of carbon dioxide and nitrogen also is substantially free of corrosive elements.

In the modification shown in Fig. 4, tube 26 is connected to the inlet of a canister 30 containing a suitable oxidation catalyst 31. If the generator is not operated at a high enough temperature to provide secondary burning of the carbon monoxide, it will be converted into carbon dioxide in passing through the catalyst.

According to the provisions of the patent statutes, we have explained the principle and construction of our invention and have illustrated and described what we now consider to represent its best embodiment. However, we desire to have

We claim:

1. A carbon dioxide gas generator comprising a housing having a side wall and a bottom wall, said bottom wall being provided with an opening, a pair of concentric perforated tubular screens mounted on said bottom wall around said opening and spaced from said side wall, said screens being spaced from each other to form a receptacle for burning carbonaceous material, one of said walls being provided with a second opening outside of said receptacle, a conduit connected to one of said openings for supplying thereto a stream of air, and means closing the upper end of the inner tubular screen, whereby said air passes through said burning material and oxygen is removed and carbon dioxide is formed, said carbon dioxide escaping through the other of said openings.

2. A carbons dioxide gas generator comprising a housing provided with an inlet and in its bottom wall with an outlet, means for supplying a continuous stream of oxygen-containing gas to said inlet, a pair of concentric perforated metal tubular members mounted on said bottom wall between said inlet and outlet, a tube in said outlet projecting up into said inner tubular member, a baffle in the upper end of said tube, said members being spaced from each other to form a a receptacle for burning carbonaceous material, whereby said gas passes through said burning material to form carbon dioxide and carbon monoxide which enter said tube, a closure for the upper end of the inner tubular member, said closure being provided with an inlet, and means for supplying additional oxygen-containing gas to said closure inlet for mixing with said carbon monoxide in said tube to convert it into carbon dioxide.

3. A carbon dioxide gas generator comprising an open-top housing having an inlet in its side wall and an outlet in the center of its bottom, a conduit for supplying a continuous stream of oxygen-containing gas to said inlet, a pair of concentric perforated metal tubular members mounted on said housing bottom around said outlet and spaced from said side wall, said members being spaced from each other to form a receptacle for burning carbonaceous material, means closing the space between the upper end of the outer tubular member and the housing, a closure member for the upper end of the inner tubular member provided with a secondary inlet, and a conduit for supplying oxygen-containing gas to said secondary inlet.

4. A carbon dioxide gas generator comprising an open-top housing having an inlet in its side wall and an outlet in the center of its bottom, a conduit for supplying a continuous stream of oxygen-containing gas to said inlet, a pair of concentric perforated metal tubular members mounted on said housing bottom around said outlet and spaced from said side wall, said members being spaced from each other to form a receptacle for burning carbonaceous material, a hopper mounted on top of the housing with its lower end closing the space between the top of the outer tubular member and the housing, a closure member for the upper end of the inner tubular member provided with a secondary inlet, and a conduit extending into said hopper and connected to said secondary inlet for supplying oxygen-containing gas to the inner tubular member.

5. A carbon dioxide gas generator comprising a housing provided with an inlet and an outlet, means for supplying a stream of oxygen-containing gas to said inlet, a perforated container for carbonaceous material mounted in said housing between said inlet and outlet so that said gas must pass through the container on its way to said outlet, whereby carbon dioxide and carbon monoxide are formed in said housing when said gas passes through said material while it is burning, a conduit for conducting said carbon dioxide and carbon monoxide out of said outlet and an oxidation catalyst disposed in the path of said carbon dioxide and carbon monoxide blowing through said conduit for substantially eliminating the carbon monoxide.

6. A gas generator comprising a housing provided with an inlet and an outlet, a conduit connected to said inlet for supplying a stream of oxygen-containing gas there to and a perforated fireproof container for burning material mounted in said housing between said inlet and outlet so that said gas must pass through the container on its way to said outlet, whereby oxygen is removed from said gas when it passes through said burning material.

7. A carbon dioxide gas generator comprising an open-top housing having an inlet in its side wall and an outlet in the center of its bottom, a conduit connected to said inlet for supplying thereto a stream of air, a pair of concentric tubular screens mounted on said housing bottom around said outlet and spaced from said side wall, a tube in said outlet projecting up into said inner screen, a baffle in the upper end of said tube, said screens being spaced from each other to form a receptacle for burning carbonaceous material, a hopper mounted on top of the housing with its lower end closing the space between the top of the outer screen and the housing, a closure member for the upper end of the inner screen provided with a secondary inlet, a conduit connected to said first-mentioned conduit and extending into said hopper and connected to said secondary inlet, and a valve in said last-mentioned conduit for regulating the supply of air to said secondary inlet.

JOHN P. SANDERSON.
PETER V. PAULUS.
WILLIAM P. YANT.

REFERENCES CITED

The following references are of record in the file of this patent:

UNITED STATES PATENTS

| Number | Name | Date |
|---|---|---|
| 432,525 | Goldwater | July 22, 1890 |
| 556,991 | Lane et al. | Mar. 24, 1896 |
| 633,221 | Sorrle et al. | Sept. 19, 1899 |
| 638,429 | Tweedale | Dec. 5, 1899 |
| 1,675,497 | Kelliher | July 3, 1928 |
| 1,731,223 | Brady | Oct. 8, 1929 |
| 2,278,204 | Lewis | Mar. 31, 1942 |

OTHER REFERENCES

Ephraim, "Inorganic Chemistry," 4th ed. 1943, p. 782. Nordeman Pub. Co., Inc., New York, N. Y.